Figure 1:
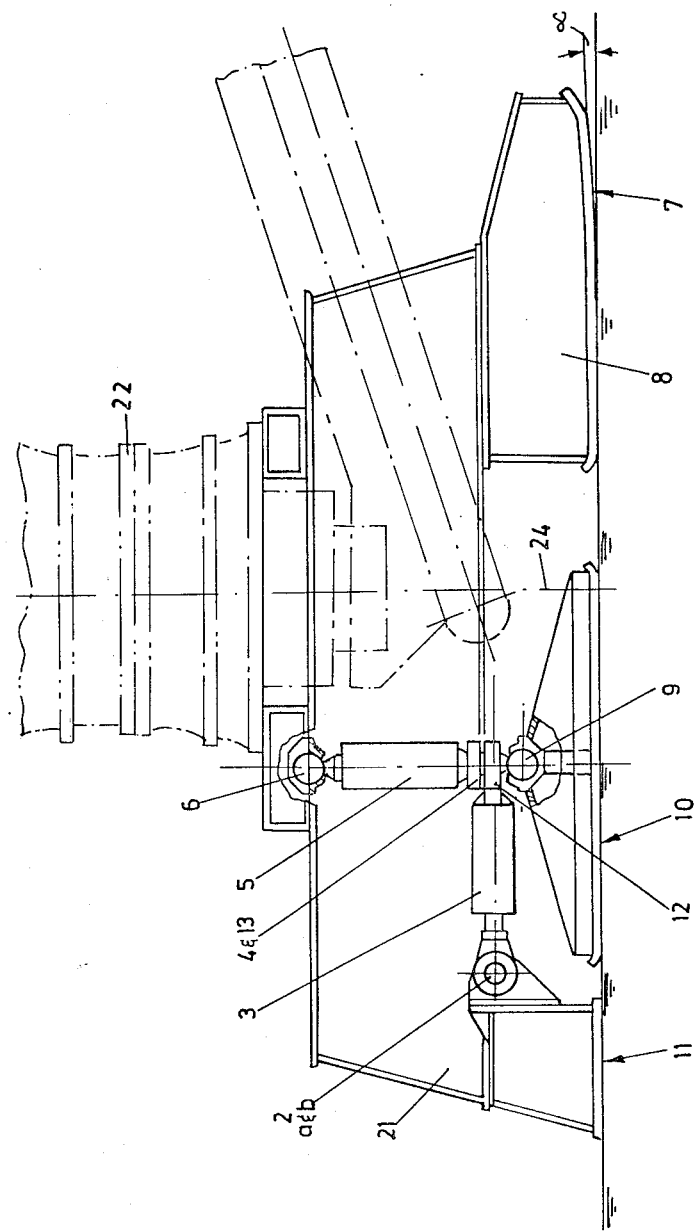

United States Patent [19]

Rabinovitch

[11] 4,324,302

[45] Apr. 13, 1982

[54] WALKING MACHINES

[75] Inventor: Yosef K. Rabinovitch, Johannesburg, South Africa

[73] Assignee: Edward L. Bateman Limited, Boksburg North, South Africa

[21] Appl. No.: 129,694

[22] Filed: Mar. 12, 1980

[30] Foreign Application Priority Data

Mar. 13, 1979 [ZA] South Africa ............... 79/1179

[51] Int. Cl.³ ............................................. B62D 57/02
[52] U.S. Cl. ................................................... 180/8 C
[58] Field of Search ............................... 180/8 R, 8 C

[56] References Cited

U.S. PATENT DOCUMENTS

| | | | |
|---|---|---|---|
| 3,807,519 | 4/1974 | Patch | 180/8 C |
| 3,853,196 | 12/1974 | Guest | 180/8 C |
| 4,014,399 | 3/1977 | Ruder | 180/8 C |

FOREIGN PATENT DOCUMENTS 2129197 12/1972 Fed. Rep. of Germany ..... 180/8 R

*Primary Examiner*—David M. Mitchell
*Assistant Examiner*—D. W. Underwood
*Attorney, Agent, or Firm*—Fleit & Jacobson

[57] ABSTRACT

A walking machine comprises two pillars 8 and 11 normally resting on the ground and supporting a load 22 on a platform 21 eccentrically between the pillars. A lifting leg 5 is connected by means of ball joints to a foot and the platform and can be moved by means of two double acting hydraulic jacks to alter its inclination in two planes. In use the platform is first tilted by extending the lifting leg towards the load and at an angle. One of the jacks is then actuated to get the lifting leg vertical so that the platform drags at one end. The platform is then levelled and the process repeated for as many times as are necessary.

8 Claims, 7 Drawing Figures

WALKING MACHINES

This invention relates to walking machines of the kind suitable for moving heavy loads short distances at a time.

In order to facilitate operations it has been proposed to keep a crushing plant close to the mining face in operations such as quarrying. However, to move large and heavy machines such as crushers from time to time is no simple matter.

If the moving is on wheels, large and extremely expensive wheeled load carriers have to be provided and these or the machines are fitted with special loading attachments.

On the other hand walking machines comprising a number (usually three) hydraulically operated legs have also been proposed. The legs lift the entire machine off the ground in the process of walking. Machines of this kind are also expensive.

An object of the invention is to provide a method of moving a load and a walking machine which are not as expensive as those previously in use.

According to the invention a method of moving a loaded platform consists in the steps of tilting the platform by jacking the platform eccentrically to the centre of gravity of the load and in a direction inclined to the vertical in the direction of such centre of gravity, exerting forces between the jacking axis and the platform to cause the jacking direction to become vertical and the platform to drag at one end, levelling the platform in its new position and in that new position repeating the preceding steps and repeating the steps as often as is required until the platfrom reaches a desired position.

A walking machine according to the invention comprises first and second spaced apart pillars adapted to rest on the ground, a platform spanning the pillars and adapted to support a load eccentrically to the middle plane between the pillars and over the first pillar, a powered extensible and retractable leg pivotally mounted to the platform at the middle plane to move along a first path towards and away from each pillar, a massive foot pivoted to the extensible leg and first power means to cause the leg to move along its path.

Also according to the invention the extensible leg is universally pivoted at each end and second power means is provided to cause the leg to move in a second path transverse to the first path.

Figure 2:
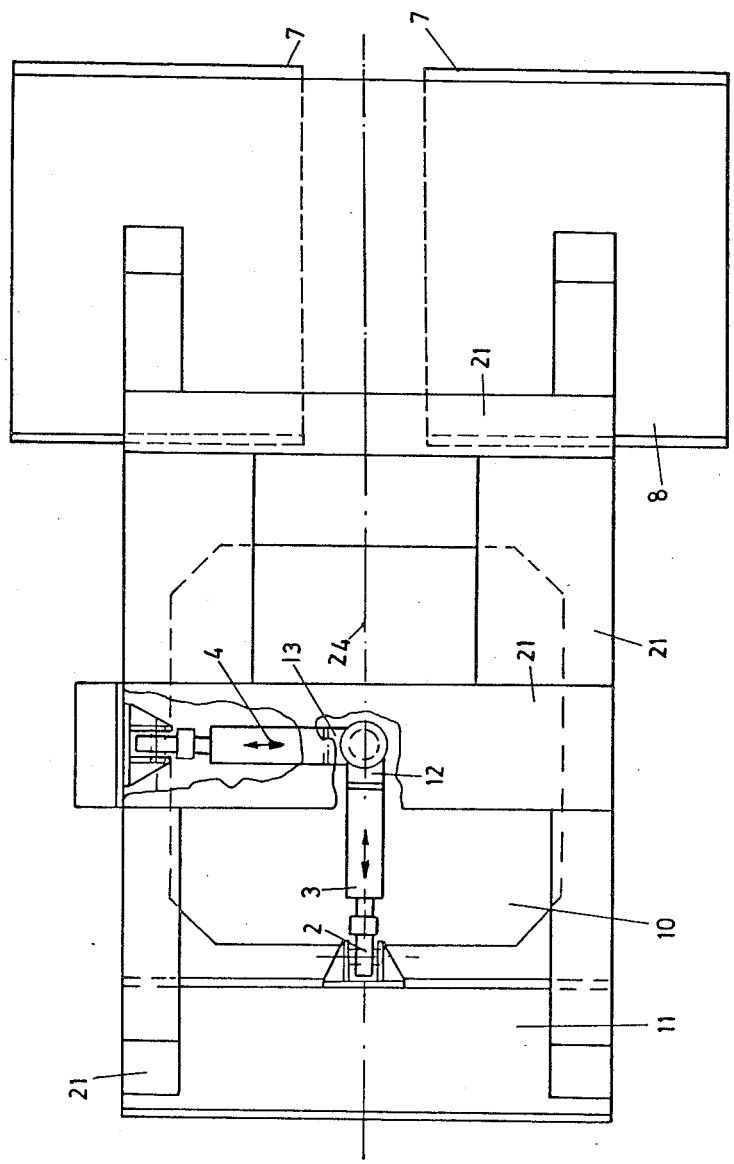
Figure 3:
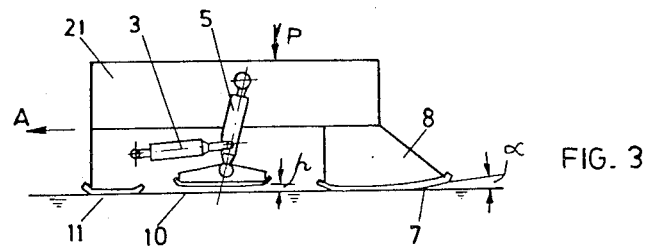
Figure 4:
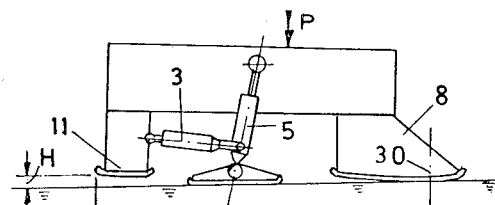
Figure 7:
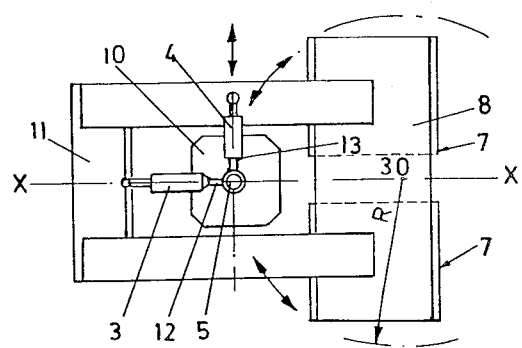

FIG. 1 is a side view with parts in section of a platform according to the invention, FIG. 2 is a plan view of FIG. 1, FIGS. 3 to 6 are diagrammatic views showing the device in operation, and FIG. 7 is a diagrammatic plan view illustrating the extent of movement of the device.

In the illustrated embodiment a platform is composed of frame members 21. The platform rests on two abutments 11 and 8, with the latter having a ski base fitted with two skis 7. A crusher 22 is shown in dotted lines in FIG. 1 in position on the platform. It will be seen that the crusher 22 is supported to the right and closer to the abutment 8 than the abutment 11 with its centre of gravity acting along the chain line 24. The frame members 21 and the abutments 11 and 8 are made robust enough to support the crusher 22 in use.

A double acting ram having a cylinder 5 is connected to a frame member by means of a ball and socket joint 6 at one end. At the other end it carries a massive foot 10 also by means of a ball and socket joint 9.

Another double acting hydraulic ram 3 is pivoted to the abutment 11 and to the ram cylinder 5 just above the foot 10, while a third ram 4 also acts between the bottom of the cylinder 5 and the structure depending from a frame member 21.

In the result the foot 10 can be lifted and lowered relatively to the frame, can be moved to and fro between the abutments 11 and 8 and can be swung to left and right in the space between the abutments. A combination of the two latter movements can cause the foot 10 to slew in any desired direction.

Figure 5:
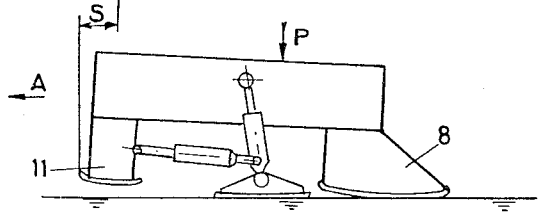
Figure 6:
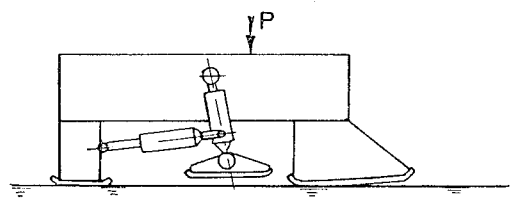

FIGS. 3 to 6 illustrate the operation of the rams 3 and 5 to cause travel in the direction of the arrow A. First (FIG. 3) the foot 10 is lifted and pulled to the left. Next (FIG. 4) the cylinder 5 is extended to tilt the platform about a line 30 on the skis 7. Next the ram 3 is extended as shown in FIG. 5. This causes the abutment 8 to be dragged on the ski base 7 to the left. By repeating this procedure as many times as is necessary the crusher 22 can be moved to a new position.

In the event that a change in direction is required the ram 4 is actuated to position the foot 10 to the right or to the left of centre before the ram 5 is extended to tilt the platform. When the ram 3 is now actuated, the abutment 8 not only drags to the left but also slews around the ram 5.

It will be seen that with one lifting ram 5, which lifts only part of the load, and two rams 3 and 4 acting on the ram 5, a load can be moved as effectively as was done in the past utilizing at least three lifting rams and at least one other ram acting on each lifting ram. There is always at least three point contact with the ground provided by the foot 10 and the skis 7.

I claim:

1. A method of moving a loaded platform consisting in the steps of:
   tilting the platform by jacking the platform along a single jacking axis eccentrically to the centre of gravity of the load and in a direction inclined to the vertical in the direction of such centre of gravity;
   exerting forces between the jacking axis and the platform to cause the jacking direction to become vertical and the platform to drag at one end, levelling the platform in its new position, and in that new position repeating the preceding steps and repeating the steps as often as is required until the platform reaches a desired position.

2. The method claimed in claim 1 in which forces may be exerted between the jacking axis and the platform in two directions at right angles to one another, one direction going along a line joining the jacking axis and the vertical through the centre of gravity of the load.

3. A walking machine comprising:
   first and second pillars 8 and 11 adapted to rest on the ground, a platform 21 spanning the pillars and adapted to support a load 22 eccentrically to the middle plane between the pillars and over the first pillar 8,
   a single powered extensible and retractable leg 5 pivotally mounted to the platform at the middle plane to move along a first path towards and away from each pillar,
   a massive foot 10 pivoted to the extensible leg 5, and first power means 3 to cause the leg 5 to move along the first path.

4. The walking machine claimed in claim 3 in which the extensible leg 5 is universally pivoted at each end.

5. The walking machine claimed in claim 3 in which second power means 4 is provided to cause the leg to move in a second path transverse to the first path.

6. The walking machine claimed in claim 5 in which the power means are a double acting hydraulic jacks.

7. The walking machine claimed in claim 6 in which the leg is connected to each of the foot and the platform by ball and socket joints.

8. The walking machine claimed in claim 7 in which the pillar closely below the load is fitted with a pair of skis to enable three point contact with the ground to take place by means of the foot and the skis.

* * * * *